United States Patent [19]

Arena

[11] Patent Number: 4,459,372

[45] Date of Patent: Jul. 10, 1984

[54] SURFACE-METALLATED REFRACTORY INORGANIC OXIDES, METHOD OF THEIR PREPARATION AND CATALYST SUPPORTED ON THE OXIDES

[75] Inventor: Blaise J. Arena, Des Plaines, Ill.

[73] Assignee: UOP Inc., Des Plaines, Ill.

[21] Appl. No.: 411,205

[22] Filed: Aug. 25, 1982

[51] Int. Cl.$^3$ .................. B01J 21/04; B01J 21/06; B01J 21/08; B01J 23/22

[52] U.S. Cl. .................. 502/351; 502/240; 502/242; 502/244; 502/246; 502/247; 502/255; 502/256; 502/258; 502/259; 502/260; 502/261; 502/262; 502/263; 502/308; 502/309; 502/312; 502/324; 502/325; 502/337; 502/338; 502/339; 502/345; 502/347; 502/349; 502/352; 502/354; 502/355; 502/439

[58] Field of Search ............... 252/454, 456, 461, 463, 252/464; 423/628; 502/240, 242, 244, 246, 247, 255, 256, 258, 259, 260, 261, 262, 263, 308, 309, 312, 324, 325, 337, 338, 339, 345, 347, 349, 351, 352, 354, 355, 439

[56] References Cited

U.S. PATENT DOCUMENTS

| | | | |
|---|---|---|---|
| 2,399,488 | 4/1946 | Hearne | 252/463 X |
| 3,565,919 | 2/1971 | Friedrichsen et al. | 252/464 X |
| 3,910,851 | 10/1975 | Messing | 252/461 X |
| 4,196,101 | 4/1980 | Wilson et al. | 252/463 X |
| 4,388,222 | 6/1983 | Wilson et al. | 252/465 X |

Primary Examiner—W. J. Shine
Attorney, Agent, or Firm—James R. Hoatson, Jr.; Eugene I. Snyder; William H. Page, II

[57] ABSTRACT

Surface-metallated aluminas and silicas are species many of whose physical properties, such as surface area and pore volume, are unchanged but which exhibit superior hydrothermal stability. Suitable for use as catalytic supports, these materials can be simply prepared by treating the alumina or silica with a tetrahalide of a metal, such as titanium or zirconium, removing the unreacted tetrahalide, and calcining the resulting material in a moist atmosphere.

16 Claims, No Drawings

SURFACE-METALLATED REFRACTORY INORGANIC OXIDES, METHOD OF THEIR PREPARATION AND CATALYST SUPPORTED ON THE OXIDES

Refractory inorganic oxides play a central role in a multitude of chemical processes in a variety of ways. In some processes, hydrogenation for example, such oxides have a more-or-less passive role as a physical support for another active species, as for example, a zerovalent metal. In other processes, exemplified by various separation methods, the inorganic oxides are utilized for their physiochemical properties, such as adsorption and absorption. In still other processes, exemplified by alkylation reactions and hydrocracking, the inorganic oxides are used as catalysts per se where their catalytic properties are associated with their Lewis acid behaviour.

Oxides such as alumina and silica find particularly broad utilization in the chemical industry, partly because of their widespread availability and partly because of their relatively low cost. Their properties may be modified by the method of preparation to afford a spectrum of aluminas and/or silicas whose differences become important in specific areas of use. For example, the acidity of an alumina may be increased by impregnation with fluoride ion, or decreased by impregnation with lithium ion. As another example, the surface area and pore volume of alumina decreases as one goes from the gamma phase to the alpha phase.

A discovery of this invention is that inorganic oxides, especially silica and alumina, may be surface-metallated by a variety of metals. What is meant by a "surface-metallated" alumina or silica is an alumina or silica whose surface hydroxyl groups have been replaced, at least in part, by an oxygen-metal bond where the metal itself is part of another inorganic oxide. Another discovery is that such surface-metallated oxides possess modified properties which impart substantial advantages to said oxides. One such advantage is an increased hydrothermal stability of surface-metallated oxides. Another advantage is modification of the acid-base properties at the surface of such oxides while leaving unaffected their bulk properties. Yet another advantage may lie in the modification of chemisorption behaviour upon surface-metallation, with minimal concomitant influence on physical absorption.

DESCRIPTION OF THE INVENTION

In one aspect the invention described herein is a surface-metallated alumina or silica where the metal is selected from the group consisting of titanium, zirconium, hafnium, vanadium, tantalum, niobium, silicon, germanium, tin, and lead. In another aspect the invention is a method of preparing a surface-metallated alumina or silica comprising contacting a tetrahalide of a metal selected from the aforementioned group with alumina or silica, removing the excess tetrahalide which is not bound to the surface, calcining the material obtained therefrom, and recovering the resulting surface-metallated alumina or silica.

It long has been known that materials of commerce referred to as "alumina" and "silica" are not simply represented by the formulae $Al_2O_3$ and $SiO_2$, respectively. Instead such materials usually are "hydrates" in the sense that they contain varying amounts of water which may be removed at elevated (and usually considerably elevated) temperatures. In large part the "hydrates" are manifested as surface hydroxyl groups, themselves important modifiers of the surface properties of alumina and silica. We have discovered that such surface hydroxyls can react with various metal tetrahalides with formation of an oxygen-metal bond. The halides remaining bonded to the metal may be converted to oxygens, leading to the surface-metallated aluminas and silicas of this invention.

It is also to be clearly understood that the aluminas and silicas referred to herein are porous materials. That is, there are a multitude of pores and channels from the exterior of a discrete, macroscopic particle to the interior of the particle. Consequently, the surface of an alumina or silica includes all the pores and channels of such materials, and their surface area as measured by nitrogen gas adsorption according to B.E.T. theory includes such surfaces. In fact, generally there will be more surface in the interior of a discrete, macroscopic particle than on its exterior. In this application "surface" is used in such an art-recognized fashion, and is not to be restricted to the physical exterior of a macroscopic particle.

Although we do not wish to be bound by any theory or conceptual framework, the working hypothesis we have employed makes our invention more understandable. The reactions thought to occur are represented by the following scheme, where M represents a metal, X is a halogen, ∼ is an alumina or silica surface, and where the last structure represents a surface-metallated alumina or silica.

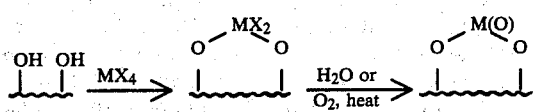

Although the above equation represents reaction of two of the four halides with surface hydroxyls, it must be understood that from one to all four halogens may react, with a corresponding change in the final structure of the surface-metallated alumina or silica. It is to be clearly understood that the invention claimed herein includes all the surface-metallated species which may be so formed. We emphasize again that this is merely a working hypothesis, consistent with all available data, but we do not vouch for its veracity and we do not wish to be bound by it.

As the last structure suggests, the metal from surface-metallation forms an oxide layer on each surface of the alumina or silica. Conceptually, this is tantamount to each crystallite of an alumina or silica being more-or-less encased in a thin shell of another metal oxide, with each macroscopic particle of an alumina or silica consisting of an agglomeration or collection of crystallites. One result of this conceptual model is that physical properties, such as surface area, pore volume and pore size could be expected to be relatively unaffected upon surface metallation. That this is the case in fact is confirmed by physical measurements. Another result is that the chemical properties of surface-metallated alumina or silica assume some of the characteristics of the surface metal. Thus one has a curious and useful blend of the old and the new.

To prepare the surface-metallated alumina or silica of this invention one may contact the alumina or silica with a tetrahalide of a suitable metal. Any physical form of alumina or silica may be used, e.g., pellets, spheres, rods, and so on. It will be appreciated that the surface-to-volume ratio of the various forms may differ appreciably, thereby resulting in relatively differing amounts of metal which may be deposited on the surface. Different phases of alumina also may be used, but not necessarily with equivalent results since, for example, gamma alumina has many more surface hydroxyls which can be metallated than, say, alpha alumina.

The metals which may be employed include titanium, zirconium, hafnium, vanadium, tantalum, niobium, silicon, germanium, tin, and lead, with silicon being used only on alumina. Among these titanium and zirconium are particularly advantageous. The stability and availability of the various tetrahalides make the tetrachloride preferable to all others, but the tetrafluoride, tetrabromide, and tetraiodide may be used although not necessarily with equivalent results.

Contacting of the metal tetrahalide with the silica or alumina may be done using neat metal tetrahalide where the latter is a liquid, using a solution of the halide, or by vapor deposition of the tetrahalide where its vapor pressure is sufficient.

Where the metal tetrahalide is a liquid it suffices to mix the alumina or silica with said halide for a time from about 15 minutes to about 1 hour, depending upon the relative amounts of solid and liquid, the particular metal tetrahalide used, and so forth. When reaction is complete excess liquid is removed by decantation or filtration and the solid recovered. Where a solution of metal tetrahalide is used suitable solvents include diethylether, dipropylether, tetrahydrofuran, tetrahydropyran, and other ethers, ethylacetate, propylacetate, butylacetate, and other esters. The concentration of metal tetrahalide is not important except insofar as it may affect reaction time. Surface metallation is achieved merely by mixing the solution with alumina or silica until reaction is complete, typically from about one hour to about 3 hours depending on solution concentration. As above, excess liquid is removed by decantation and/or filtration and the solid recovered.

Where the vapor pressure of the metal tetrahalide permits, vapor deposition is the method of choice for converting the surface hydroxyls to metallated specie. One reason is that it permits facile control of the amount of metal introduced. Another reason is that, in contrast to the prior methods using liquids, no excess adhering but unbound metal tetrahalide remains to be removed, thereby eliminating an entire step in the preparation.

Vapor deposition is done conveniently by contacting a stream of an inert gas containing vapors of metal tetrahalide with alumina or silica. Suitable inert gases include nitrogen, helium, argon, and the remaining inert group gases. Where the gas stream is passed through a bed of alumina or silica, the amount of surface metallation varies with bed temperature, thereby affording some degree of control of metallation.

When the surface-metallation is performed using liquid metal tetrahalide, whether neat or in solution, excess adhering but unbound halide must be removed. Where the halide is sufficiently volatile, the preferred method or removal is by heating the treated alumina or silica in an inert atmosphere. The temperature will depend on such factors as inert gas flow and the specific metal tetrahalide used. For example, where titanium tetrachloride is used a temperature from about 100° to about 200° C. for a time from about 1 to about 5 hours will suffice.

Another means of removing excess adhering but unbound halide is by washing the treated alumina or silica with copious quantities of solvent. The aforementioned solvents used to prepare solutions by which the alumina or silica is metallated may also be utilized for the washing step, and are not here repeated.

The final step in preparing the materials of this invention is calcination, wherein all halogen-metal bonds are converted to oxygen-metal bonds. Calcination may be performed in air, or in an inert atmosphere and in the presence of some moisture, typically at a temperature from about 300° to about 600° C., and more usually in the temperature range from about 450° to about 550° C.

If inadequate water is present in the calcination step the material will contain appreciable amounts of absorbed residual halide. It is highly desirable to remove such adsorbed halide in order to impart maximum hydrothermal stability to the compositions of this invention, and removal is most conveniently effected by steam treatment, which is to say passing a moisture-laden gas through the material at a temperature in excess of about 400° C. for a time sufficient to reduce the halide to the desired level.

The metal content of the surface-metallated aluminas and silicas of this invention varies with such factors as the metal tetrahalide, the amount used in contacting with the alumina or silica, contact time, and the relative number of surface hydroxyl groups of the latter. For example, gamma aluminas can differ widely as to availability of surface hydroxyl groups but all have more such groups than does alpha alumina. Using titanium as an example, surface-titanated alumina may be prepared having as high as about 20% by weight titanium.

A measure of the number of surface hydroxyl groups of alumina or silica may be obtained by deuterium exchange experiments. Using a titanated alumina as a representative example of the group, it has been found that the number of titanium atoms in the compositions of this invention is the same as the number of surface hydroxyl groups of the precursor alumina, within experimental error.

Scanning electron microscopy, scanning transmission electron microscopy, and electron spectroscopy for chemical analysis (ESCA) all show that titanium is distributed uniformly through a particle of alumina. That is, if a particle is sectioned the titanium is distributed homogeneously across the section. A similar result would be obtained if surface hydroxyl groups were probed, supporting the correlation between surface hydroxyls and titanium deposition.

ESCA analysis shows that titanium is present in the +4 oxidation state, and line width observations suggest the presence of Ti-O-Al bonds. However, it is to be stressed that in the materials of the present invention the Ti-O-Al structure is superimposed on an underlying alumina structure, and does not form an extensive polymeric network.

X-ray analysis of samples sometimes show titanium without any detectable $TiO_2$, but sometimes show a discrete $TiO_2$ phase. This also seems to be correlatable with the number of surface hydroxyl groups, in the sense that when the number of atoms of titanium is less than, or about the same as, the number of surface hydroxyl groups no $TiO_2$ phase is observed, but when the number of titanium atoms is substantially greater than the number of surface hydroxyls a separate $TiO_2$ phase appears. The percent metal content at which this will occur clearly depends upon the nature of the alumina used, but for many gamma aluminas a discrete $TiO_2$ phase makes its initial appearance above about 4–5% titanium. It is to be stressed that such a phase is not an integral feature of our invention but is only incidental thereto. Using highly hydrated aluminas, as an example, a titanium content up to about 20% may be attained, although the range of 1–12% titanium is more common.

The uses perceived for the surface-metallated aluminas and silicas of this invention are as varied and numerous as their nonmetallated precursors. The materials of this invention may be used as catalyst supports. It has been found that many metals may be dispersed or deposited on the materials herein, including, as examples, chromium, manganese, iron, cobalt, nickel, copper, molybdenum, ruthenium, rhodium, palladium, silver, rhenium, osmium, iridium, platinum, and combinations thereof, to give catalysts effective in processes such as reforming and hydrogenation. When the metal is titanium or zirconium, the surface-metallated aluminas show substantially increased hydrothermal stability, thereby permitting their use in aqueous systems under conditions heretofore not possible. The materials herein also may be used directly as the stationary phase (adsorbent) in separation processes, and may be further modified to yield novel ion exchange materials.

Catalytic compositions using as supports the surface-metallated aluminas and silicas of this invention may be prepared in the same manner as are the catalysts using non-metallated alumina or silica as supports. For example, the support may be mixed with a solution of a salt of the metal to be used for its catalytic activity. Excess solvent may be removed, the resulting material may be calcined, usually in an inert atmosphere, and the metal impregnated on the support may be reduced if the zerovalent state is desired.

It is to be understood that the above description of preparing a catalytic composition is merely exemplary. The methods used are well known to the skilled worker in the art, and it is to be understood that the catalytic compositions of this invention can be prepared by any appropriate method.

The following examples serve only to illustrate the invention and are not intended to limit it in any way.

EXAMPLE 1

Two types of gamma-alumina in the form of spheres were placed in a glass container and covered with neat titanium tetrachloride in a nitrogen atmosphere. After about 10 minutes the $TiCl_4$ was removed by decantation, and the solid was washed extensively with ether (about 3 liters per 100 ml alumina) added in small portions with swirling. Excess ether was removed in vacuum, and the adhering but unbound $TiCl_4$ was removed by heating a bed of solid at 150° C. under a downflow of nitrogen for 1 hour. The resulting material was calcined in air at 500° C. for 3 hours followed by steam treatment. Comparison of the untreated and surface-titanated alumina are given in Table 1, where the aluminas are identified simply as A and B, which shows that surface-titanation has little effect, if any, on such properties as surface area, pore volume, and pore diameter.

TABLE 1

| Properties of Untreated and Surface-Titanated Gamma Alumina | | | | |
|---|---|---|---|---|
| | A | | B | |
| | untreated | surface titanated | untreated | surface titanated |
| Surface area, $m^2/g$ | 199 | 156 | 165 | 132 |
| Pore volume, ml/g | 0.57 | 0.51 | 0.41 | 0.32 |
| Pore diameter, Å | 115 | 131 | 99 | 97 |
| % Ti | 0 | 7.55 | 0 | 10.9 |

Both untreated and surface-titanated gamma alumina as represented by A in Table 1 were tested for hydrothermal stability by treating 2.5 g material in 50 ml of 50% aqueous sorbitol at 135 atm. hydrogen and 130° C. for 24 hours. When using untreated A the solution contained 60 ppm Al; when using surface-titanated A the solution contained 3.5 ppm Al and less than 1 ppm Ti. Thus the hydrothermal stability of alumina is dramatically improved by surface-titanation.

EXAMPLE 2

A mixture of 25 ml gamma-alumina as spheres and enough $TiCl_4$ to cover the spheres were contacted at room temperature under nitrogen for about 10 minutes. The excess $TiCl_4$ was removed by decantation and the spheres were heated in a vertical furnace tube for 1 hour at 150° C. in flowing nitrogen followed by 3 hours at 500° C. in flowing moist air. Some properties of treated and untreated material are summarized as follows:

| | untreated | surface titanated |
|---|---|---|
| Surface area, $m^2/g$ | 199 | 173 |
| Pore volume, ml/g | 0.57 | 0.49 |
| Pore diameter, Å | 115 | 113 |
| % Ti | 0 | 3.81 |

EXAMPLE 3

A bed of alumina (about 60 ml) was maintained at 25°, 80°, or 150° C. A stream of $TiCl_4$-laden nitrogen was passed through the bed for 3, 5 and 12 hours, respectively, at the end of which time the alumina was calcined in moist air at 500° C. for 1 hour. At 25° C. the resultant surface-titanated alumina analyzed for 3.75% Ti; at 80° C., 3.40% Ti; at 150° C., 2.70% Ti.

EXAMPLE 4

Surface-titanated aluminas were prepared by the method described in Example 1 or 2. Chloride was removed by steam stripping at 525° C., using 0.67 cc $H_2O$/min and 3600 cc air/min for 6 hours in half the samples. Some pertinent physical properties, including X-ray diffraction results, are given in the following table where the entries paired by sample designation correspond to chloride stripped material and its precursor.

TABLE 3

| | Properties of Some Surface-Titanated Aluminas | | | | | | | |
|---|---|---|---|---|---|---|---|---|
| Sample | A | | B | | C | | D | |
| Method of preparation[a] | 1 | 1 | 1 | 1 | 2 | 2 | 2 | 2 |
| LOI @ 900° C., % | 2.51 | 0.81 | 1.31 | 0.53 | 2.00 | 0.86 | 1.96 | 0.79 |
| Wt. % Ti[b] | 7.73 | 7.59 | 3.74 | 3.83 | 8.62 | 8.99 | 3.69 | 1.97 |
| Wt. % Cl | 2.80 | 0.08 | 1.78 | 0.02 | 2.18 | 0.09 | 2.38 | 0.01 |
| Surace area, $m^2/g$ | 180 | 216 | 150 | 159 | 189 | 154 | 146 | |

TABLE 3-continued

| | Properties of Some Surface-Titanated Aluminas | | | | | | | |
|---|---|---|---|---|---|---|---|---|
| Sample | A | | B | | C | | D | |
| Pore volume, ml/g | 0.47 | 0.49 | 0.33 | 0.33 | 0.47 | 0.29 | 0.39 | 0.35 |
| Pore diameter, Å | 104 | 91 | 88 | 84 | 99 | 61 | 101 | 96 |
| $TiO_2$ phase[c] | + | + | − | − | + | + | − | − |

[a] 1 = method of Example 1; 2 = method of Example 2
[b] Determined by atomic absorption spectroscopy
[c] + means $TiO_2$ detected by X-ray diffraction, − indicates none detected

EXAMPLE 5

A solution of 9.8 g hydrated nickel nitrate in 25 ml deionized water was contacted with 18 g titanated alumina spheres (7.55% Ti) in a rotary evaporator in vacuo under steam heating. The impregnated spheres were calcined in air at 450° C. for 2.5 hours and the nickel was reduced in flowing hydrogen at 450° C. over a period of 3 hours.

What is claimed is:

1. A method of preparing a surface-modified alumina or silica comprising contacting in the absence of water, alumina or silica with the gaseous tetrahalide of an element selected from the group consisting of titanium, zirconium, hafnium, vanadium, tin, lead, tantalum, niobium, germanium, or silicon, and combinations thereof, calcining the resulting material at a temperature from about 300° to about 600° C., and recovering the resulting surface-modified alumina or silica.

2. The method of claim 1 where the tetrahalide is a tetrachloride.

3. The method of claim 1 where the element is titanium.

4. The method of claim 1 where the element is zirconium.

5. Th method of claim 1 where the element is vanadium.

6. The method of claim 3 where the surface-modified material is titanated alumina.

7. The method of claim 4 where the surface-modified material is zirconated alumina.

8. The method of claim 5 where the surface-modified material is vanadated alumina.

9. The method of claim 1 where calcining is performed at a temperature from about 450° C. to about 550° C.

10. The product prepared by the method of claim 1.

11. The product of claim 10 where the element is titanium, zirconium, or vanadium.

12. The product of claim 10 where the element is present at a level from about 1 to about 12 percent by weight.

13. The product of claim 10 where the surface-modified material is titanated alumina.

14. The product of claim 10 where the surface-modified material is zirconated alumina.

15. The product of claim 10 where the surface-metallated material is vanadated alumina.

16. A catalytic composition comprising the product of claim 10 having deposited thereon a second metal selected from the group consisting of chromium, manganese, iron, cobalt, nickel, copper, molybdenum, ruthenium, rhodium, palladium, silver, rhenum, osmium, iridium, and platinum.

* * * * *